(12) United States Patent
Systrom et al.

(10) Patent No.: US 10,430,075 B2
(45) Date of Patent: *Oct. 1, 2019

(54) IMAGE PROCESSING FOR INTRODUCING BLURRING EFFECTS TO AN IMAGE

(71) Applicant: Facebook, Inc., Menlo Park, CA (US)

(72) Inventors: Kevin Systrom, San Francisco, CA (US); Michel Krieger, San Francisco, CA (US); Shayne Sweeney, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 15/679,030

(22) Filed: Aug. 16, 2017

(65) Prior Publication Data

US 2017/0344252 A1 Nov. 30, 2017

Related U.S. Application Data

(63) Continuation of application No. 14/656,508, filed on Mar. 12, 2015, now Pat. No. 9,772,771, which is a
(Continued)

(51) Int. Cl.
*G06F 3/0488* (2013.01)
*G09G 3/00* (2006.01)
*G06T 5/00* (2006.01)
*G06F 3/041* (2006.01)
*G06F 3/0484* (2013.01)

(52) U.S. Cl.
CPC .......... *G06F 3/04883* (2013.01); *G06F 3/041* (2013.01); *G06F 3/04845* (2013.01); *G06T 5/002* (2013.01); *G09G 3/00* (2013.01)

(58) Field of Classification Search
CPC .. G06F 3/04883; G06F 3/04845; G06F 3/041; G06T 5/002; G09G 3/00
See application file for complete search history.

(56) References Cited

U.S. PATENT DOCUMENTS 9,007,402 B2 * 4/2015 Systrom .................. G06T 5/002
345/634
2006/0181549 A1 8/2006 Alkouh
(Continued)

FOREIGN PATENT DOCUMENTS

EP 1353296 10/2003
EP 1383082 1/2007
(Continued)

*Primary Examiner* — Maurice L. McDowell, Jr.
(74) *Attorney, Agent, or Firm* — Van Pelt, Yi & James LLP

(57) ABSTRACT

Image processing includes: applying shader code to an original image to generate a blurred image version (BIV); obtaining a composite image that is generated based at least in part on the original image and the BIV, wherein the composite image is generated by: obtaining a mask that includes an unblurred region and a blurred region; applying the mask to combine the original image and the BIV to render a composite image that includes an unblurred portion comprising a portion of the original image corresponding to the unblurred region of the mask, and a blurred portion comprising a portion of the BIV corresponding to the blurred region of the mask; and outputting the composite image to be displayed.

19 Claims, 12 Drawing Sheets

Related U.S. Application Data continuation of application No. 13/622,290, filed on Sep. 18, 2012, now Pat. No. 9,007,402.

(56)     References Cited

U.S. PATENT DOCUMENTS

| | | |
|---|---|---|
| 2011/0185297 A1 | 7/2011 | Reid |
| 2011/0193980 A1 | 8/2011 | Ogasawara |
| 2012/0019688 A1 | 1/2012 | Bugnariu |

FOREIGN PATENT DOCUMENTS

| | | |
|---|---|---|
| JP | 2006072418 | 3/2006 |
| WO | 2007146574 | 12/2007 |
| WO | 2009158209 | 12/2009 |
| WO | 2012073575 | 6/2012 |

* cited by examiner

ABCD

400

EFGH

FIG. 4A

402  ABCD

EFGH

FIG. 4B

IMAGE PROCESSING FOR INTRODUCING BLURRING EFFECTS TO AN IMAGE

CROSS REFERENCE TO OTHER APPLICATIONS

This application is a continuation of co-pending U.S. patent application Ser. No. 14/656,508, entitled IMAGE PROCESSING FOR INTRODUCING BLURRING EFFECTS TO AN IMAGE filed Mar. 12, 2015 which is incorporated herein by reference for all purposes, which is a continuation of U.S. Pat. No. 9,007,402, entitled IMAGE PROCESSING FOR INTRODUCING BLURRING EFFECTS TO AN IMAGE filed Sep. 18, 2012 which is incorporated herein by reference for all purposes.

BACKGROUND OF THE INVENTION

In photography, depth of field (DOF) refers to the distance between the nearest and furthest objects in an image that appear acceptably sharp. In addition to the distance between the subject and the camera lens, various properties and settings of the lens (e.g., focal length, f-number, and format size) affect the DOF that can be achieved. A shallow DOF tends to emphasize the subject of interest while de-emphasizing the foreground and background. In traditional photography, achieving a shallow DOF typically requires more expensive equipment.

Some existing image processing applications offer a post-processing feature to mimic the effects of a shallow DOF. After a picture is taken and stored to disk, the user selects an area in the image to emphasize (e.g., by drawing a boundary box using the mouse), and the software applies blurring effects to the rest of the image. Such techniques, however, tend to be computationally intensive, and are typically unsuitable for use on mobile devices such as smartphones.

BRIEF DESCRIPTION OF THE DRAWINGS

Various embodiments of the invention are disclosed in the following detailed description and the accompanying drawings.

FIG. 4A illustrates an example of an original image.

FIG. 4B illustrates an example of a blurred image version based on the original image.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An image processing technique for selectively blurring portions of an image is described. In some embodiments, shader code is applied to an original image to generate a blurred image version, and a mask is applied to the original image and the blurred image to render a composite image that includes an unblurred portion and a blurred portion. In some embodiments, the mask is configured by the user via a touchscreen interface. The user can specify configuration parameters including mask location, shape, size, etc.

Figure 1:
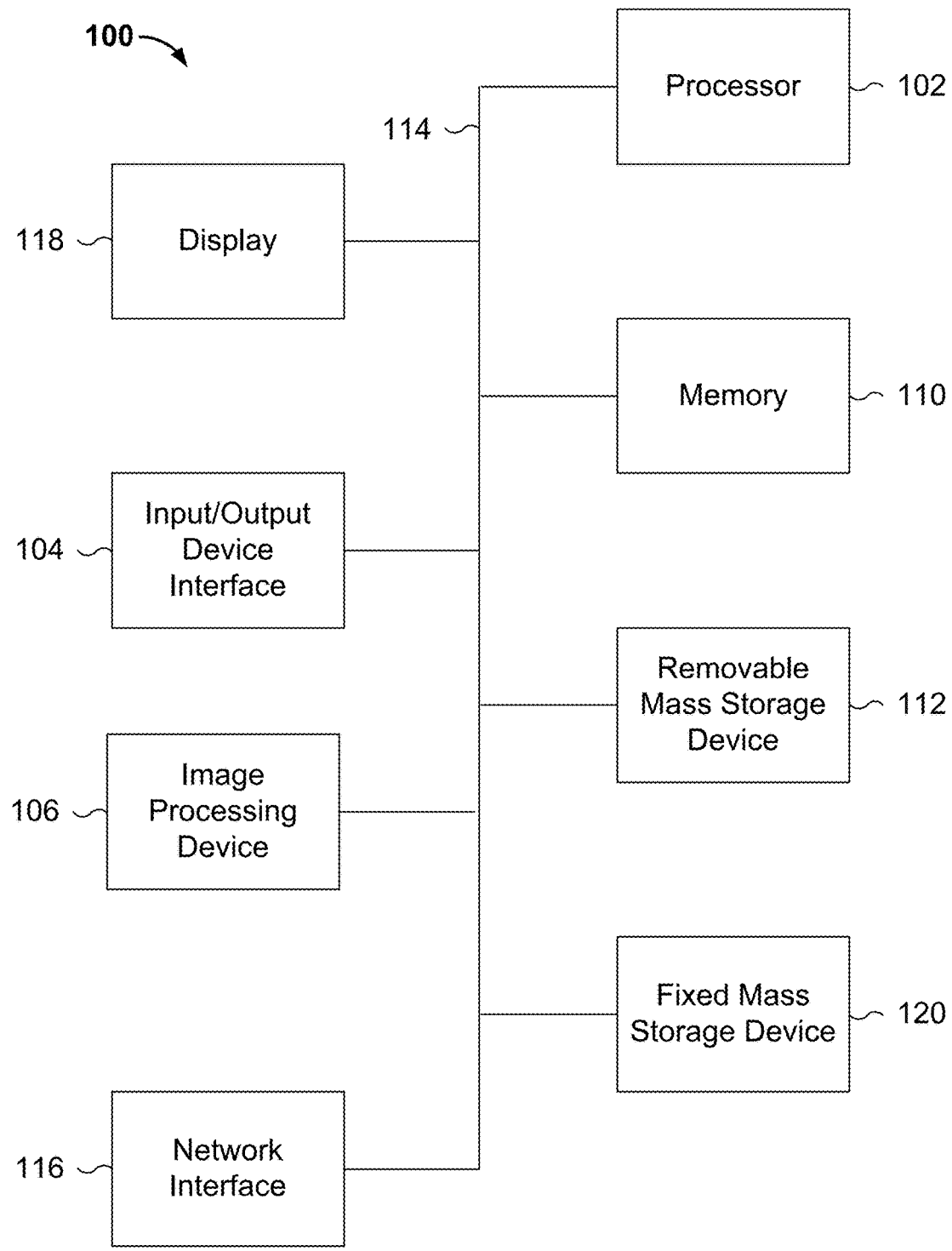
FIG. 1 is a functional diagram illustrating a programmed computer system for image processing in accordance with some embodiments.

FIG. 1 is a functional diagram illustrating a programmed computer system for image processing in accordance with some embodiments. As will be apparent, other computer system architectures and configurations can be used to perform the described image processing technique. Computer system 100, which includes various subsystems as described below, includes at least one microprocessor subsystem (also referred to as a processor or a central processing unit (CPU) 102). For example, processor 102 can be implemented by a single-chip processor or by multiple processors. In some embodiments, processor 102 is a general purpose digital processor that controls the operation of the computer system 100. In some embodiments, processor 102 also includes one or more coprocessors or special purpose processors (e.g., a graphics processor, a network processor, etc.). Using instructions retrieved from memory 110, processor 102 controls the reception and manipulation of input data received on an input device (e.g., image processing device 106, I/O device interface 104), and the output and display of data on output devices (e.g., display 118).

Processor 102 is coupled bi-directionally with memory 110, which can include, for example, one or more random access memories (RAM) and/or one or more read-only memories (ROM). As is well known in the art, memory 110 can be used as a general storage area, a temporary (e.g., scratch pad) memory, and/or a cache memory. Memory 110 can also be used to store input data and processed data, as well as to store programming instructions and data, in the form of data objects and text objects, in addition to other data and instructions for processes operating on processor 102. Also as is well known in the art, memory 110 typically includes basic operating instructions, program code, data, and objects used by the processor 102 to perform its functions (e.g., programmed instructions). For example, memory 110 can include any suitable computer readable storage media described below, depending on whether, for example, data access needs to be bi-directional or uni-directional. For example, processor 102 can also directly and very rapidly retrieve and store frequently needed data in a cache memory included in memory 110.

A removable mass storage device 112 provides additional data storage capacity for the computer system 100, and is optionally coupled either bi-directionally (read/write) or uni-directionally (read only) to processor 102. A fixed mass storage 120 can also, for example, provide additional data storage capacity. For example, storage devices 112 and/or 120 can include computer readable media such as magnetic tape, flash memory, PC-CARDS, portable mass storage devices such as hard drives (e.g., magnetic, optical, or solid state drives), holographic storage devices, and other storage devices. Mass storages 112 and/or 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can be used to provide access to other subsystems and devices as well. As shown, these can include a display 118, a network interface 116, an input/output (I/O) device interface 104, an image processing device 106, as well as other subsystems and devices. For example, image processing device 106 can include a camera, a scanner, etc.; I/O device interface 104 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 100. Multiple I/O device interfaces can be used in conjunction with computer system 100. The I/O device interface can include general and customized interfaces that allow the processor 102 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 116 allows processor 102 to be coupled to another computer, computer network, or telecommunications network using a network connection as shown. For example, through the network interface 116, the processor 102 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 104 and display 118 share the touch sensitive screen component, which both detects user inputs and displays outputs to the user). In addition, bus 114 is illustrative of any interconnection scheme serving to link the subsystems. Other computer architectures having different configurations of subsystems can also be utilized.

Figure 2:
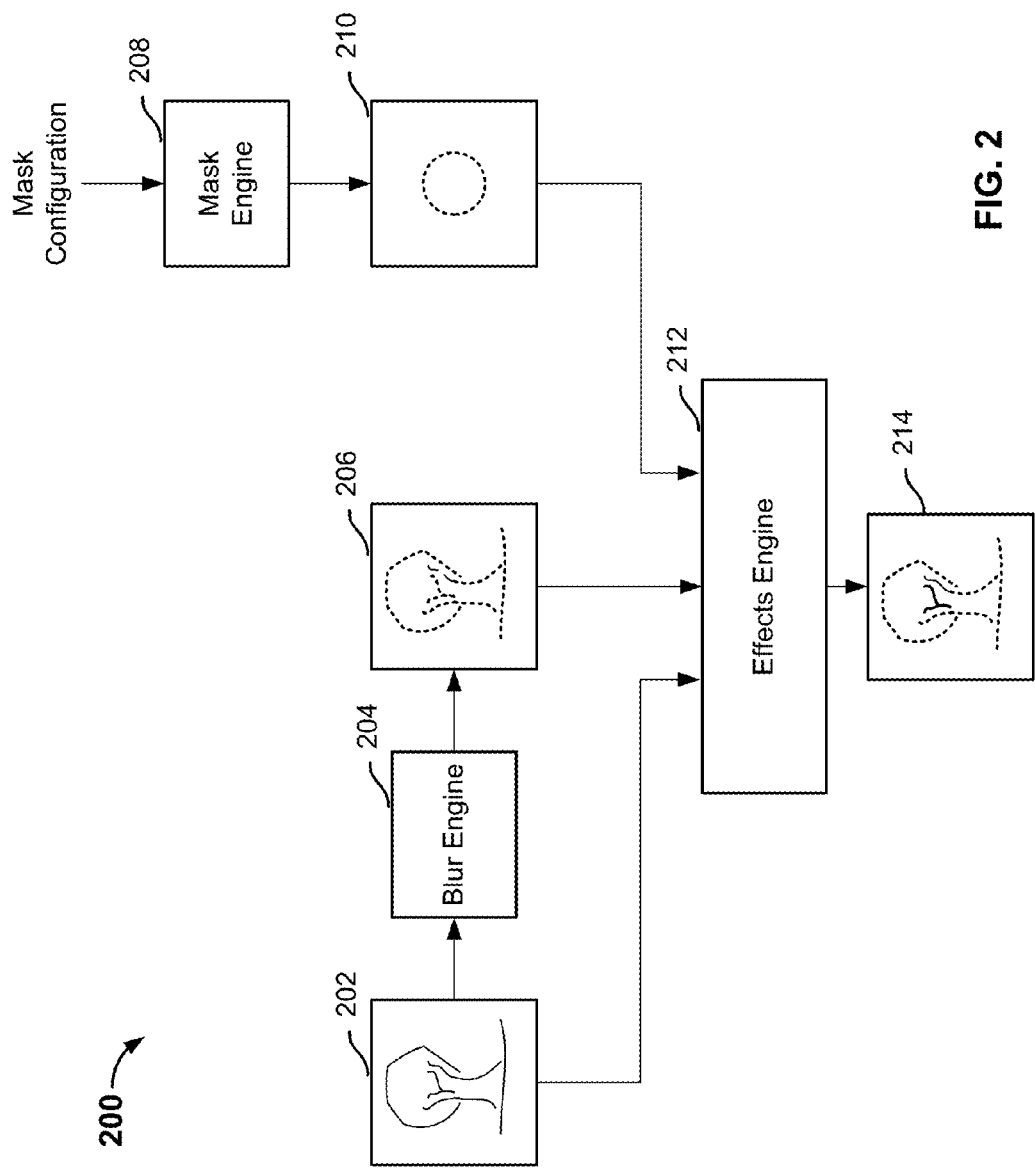
FIG. 2 is an architecture diagram illustrating an embodiment of an image processing system.

FIG. 2 is an architecture diagram illustrating an embodiment of an image processing system. In this example, an original image 202 is input into a blur engine 204. The original image can be obtained from a built-in camera, a storage location, or other appropriate data source. Blur engine 204 runs shader code, which is the set of software code that performs image processing operations to produce a blurred version of the original image (also referred to as a blurred image version) 206. In some embodiments, the shader code applies one or more low pass filter functions (e.g., a Gaussian blur function or box blur function) to the image to make the original image appear blurry.

In some embodiments, user interface facilities are provided for the user to input mask configuration information (e.g., via a touchscreen interface), which is received by mask engine 208. Based on the configuration information, mask engine 208 generates a desired mask 210. Effects engine 212 combines original image 202, blurred image version 206, and mask 210 to generate a composite image 214 in which areas are selectively in focus or blurred. As will be described in greater detail below, the area of interest that is covered by the mask will stay in focus and the rest of the image will appear blurry. In some embodiments, system 200 is implemented using a device with a built-in camera and a touchscreen, such as an iPhone® or an Android® phone.

Figure 3:
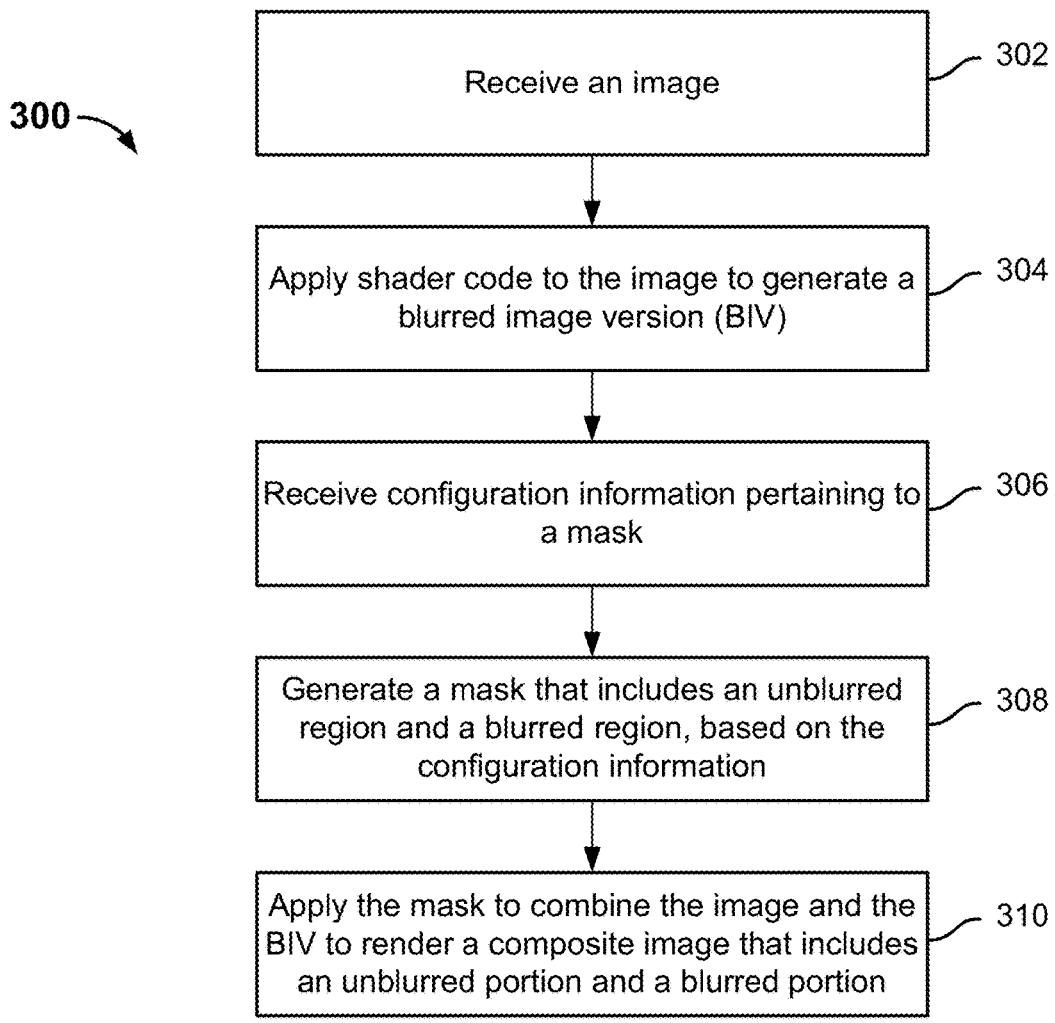
FIG. 3 is a flowchart illustrating an example process for processing an image.

FIG. 3 is a flowchart illustrating an example process for processing an image.

Process 300 may be implemented on systems such as 100 or 200.

Process 300 initiates at 302 when an image is received. The image can be captured live from a built-in camera, imported from a storage location (e.g., a camera roll or photo directory built into the system or accessible via a network), received in memory as a result of other processing operations such as a conventional filtering process, or obtained from any other appropriate source. Optionally, the image is preprocessed. For example, the dimensions of the image can be adjusted to a square image for the ease of processing; the orientation of the image can be adjusted depending on how images are stored on the device, etc.

At 304, shader code is applied to the image to generate a blurred image version (BIV). In some embodiments, a graphics programming language such as OpenGL is used to implement the shader code. In other words, the entire image is preprocessed so that a partially blurred image can be generated rapidly in response to user inputs.

At 306, configuration information pertaining to a mask is received. In some embodiments, the configuration information includes an indication of a position in the image, and optionally the size and shape of the mask. In some embodiments, the indication is received via an I/O device interface, such as a touchscreen (e.g., a capacitive touch sensitive screen), a pointing device, or other appropriate devices. In a preferred embodiment where the device includes a touchscreen, the user indicates the position in the image by placing his finger on the screen to indicate the approximate location in the image that should remain in focus (unblurred). Optionally, the user can use touchscreen gestures such as dragging to move the mask, as well as pinching and spreading of fingers to adjust the size of the unblurred region that should stay in focus, which in turn adjusts the size and shape of the mask.

At 308, a mask is generated that includes an unblurred region and a blurred region, based at least in part on the configuration information. For example, the location, shape, and size of the unblurred region are determined based on the position, shape, and size information included in the configuration information, respectively. In some embodiments, if the user does not specify any of the configuration options, default values are chosen and used. For example, a default mask is a circle located in the center of the image, having a diameter that is ¼ of the image width.

At 310, the mask is applied to combine the image and the BIV to render a composite image that includes an unblurred portion and a blurred portion. The unblurred portion includes a portion of the image corresponding to the unblurred region of the mask, and the blurred portion includes a portion of the BIV corresponding to the blurred region of the mask. Thus, the combined image gives the visual effects of having a shallow DOF.

In some embodiments, steps in the process are repeated. For example, the user can update configuration information pertaining to the mask; thus, steps 306-310 are repeated in response. As another example, images are continuously captured by a built-in camera in a live capture/video mode, and thus steps 302-310 are continuously repeated to provide the user with updated, selectively blurred images based on the current image and mask configuration. In some embodiments, the result image is saved when the user finalizes the mask configuration. In some embodiments, the user is further given the option to apply additional filters, share the final image by emailing, post to websites, etc.

FIGS. 4A-4F are diagrams illustrating images and the mask used in process 300.

FIG. 4A illustrates an example of an original image. Letters in image 400 appear to be uniformly sharp.

FIG. 4B illustrates an example of a blurred image version based on the original image. In this example, shader code is applied to image 400 to generate a blurred image version 402. Since the shader code is applied to the entire image, the blurred image version is blurry in its entirety. Details of the shader code are described below. In some embodiments, this image is not shown to the user.

Figure 4C:
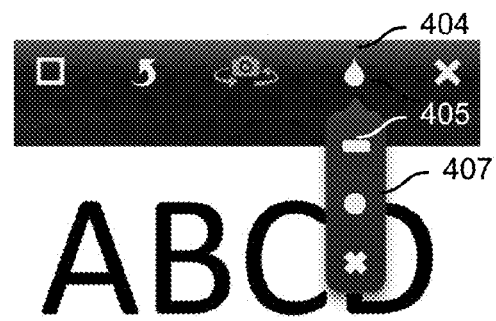
FIG. 4C illustrates an example user interface for mask selection.
Figure 4C:
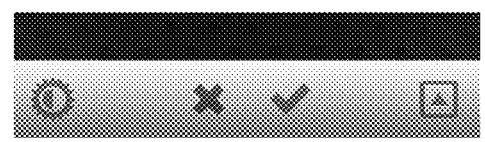

In some embodiments, the shape, size, and position of the mask are configurable by the user. FIG. 4C illustrates an example user interface for mask selection. In the example shown, the user is provided, through a menu interface 404, several shape options including a bar-shaped mask that is a bar across the image (405) and a disk-shaped mask that is a disk on the image (407). Other or additional mask options are provided in other embodiments. In the following examples, a disk-shaped mask is described in detail, although the techniques are applicable to other mask shapes.

Figure 4D:
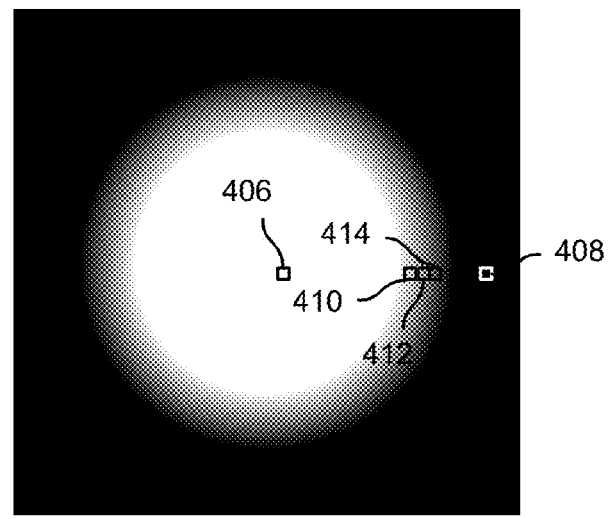
FIG. 4D illustrates an example disk-shaped mask.

FIG. 4D illustrates an example disk-shaped mask. In the example shown, it is assumed that pixels are 8-bits and RGB representation is used. Pixel 406, which lies in the center of the area of interest that should stay in focus, has RGB values of (255, 255, 255) (white); pixel 408, which lies in the area that is to be blurred, has RGB values of (0, 0, 0) (black). There is a transitional area between the area of interest and the area to be blurred. Pixels in this region transition from black to white according to a transition function that gives the mask a soft edge (e.g., an openGL smoothstep function which performs Hermite interpolation between two values according to the function (x−edge0)/(edge1−edge0)). For example, sample pixels 410, 412, and 414 have RGB values of (160, 160, 160), (127, 127, 127), and (100, 100, 100), respectively. Other values and transition functions can be used in different embodiments. Other masks (e.g., a bar-shaped mask) have similar transitions between the unblurred region and the blurred region.

Figure 4E:
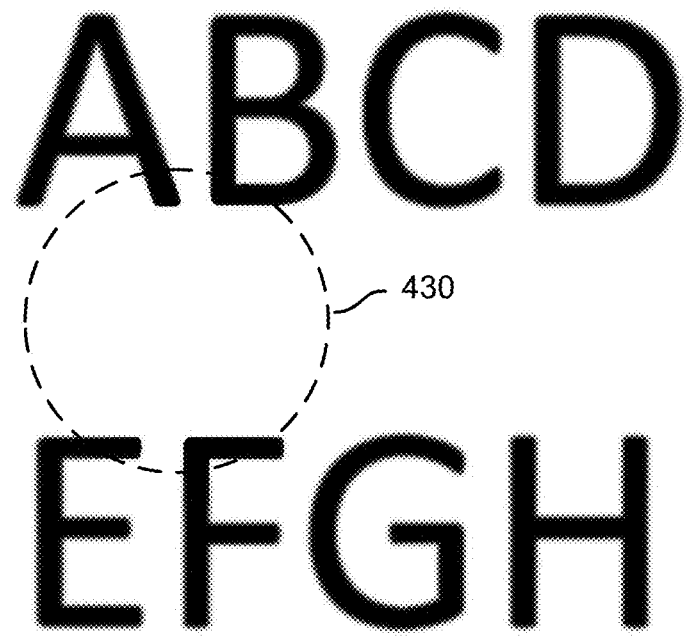
FIG. 4E illustrates an example image that is the result of applying the mask to the original image and the blurred image.

FIG. 4E illustrates an example image that is the result of applying the mask to the original image and the blurred image. In some embodiments, applying the mask includes performing a bilinear interpolation of the original image and the blurred image. For example, the value of the resulting image is computed as follows:

$$P_r = P_o * P_m + P_b * (1-P_m),$$

where $P_r$ represents a pixel value in the resulting image, $P_o$ represents a pixel value of the corresponding location in the original image, $P_m$ represents a pixel value of the corresponding location in the mask, and $P_b$ represents a pixel value of the corresponding location in the blurred image.

As shown in the resulting image, area of interest 430, which is covered by the mask, is in focus. The rest of the image is blurry. An image that has the effects of a shallow DOF is thus created.

Figure 4F:
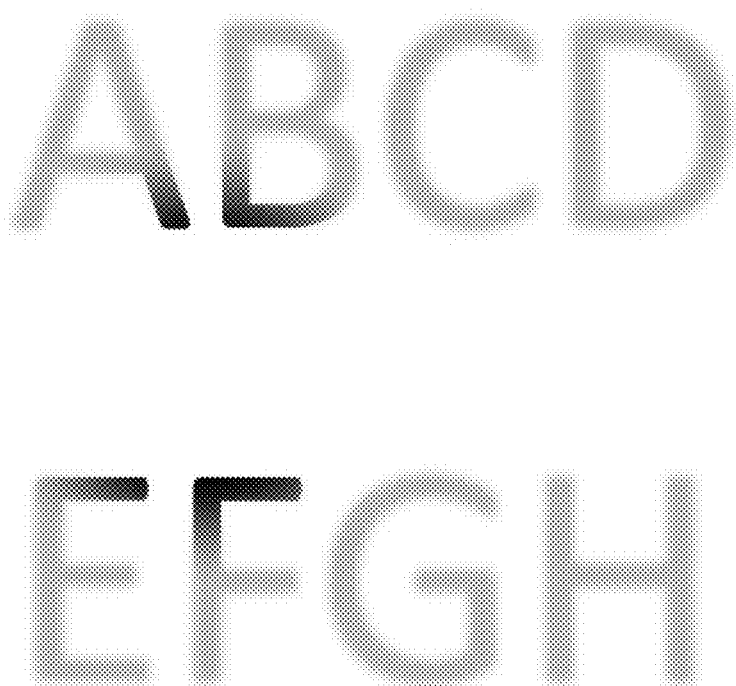
FIG. 4F illustrates an image with a further obscured blurred region.

When the user adjusts the mask, the processing application continuously updates the resulting image using the current mask so that the user can see in real-time the effects from applying the mask. In some cases, the effects of the resulting image can be subtle visually. In embodiments where the result is constantly updated while the user adjusts the mask, to provide better feedback to the user during the mask configuration process, the image processing technique further enhances the visual differences of the unblurred region and the blurred region. An additional color is applied to the blurred region in some embodiments. For example, a secondary mask that has the same shape as the current mask but is set to a particular color (e.g., white) in the blurred region can be added to the resulting image to make the blurred region appear to be tinted with the color, giving the blurred region a fog-like, more obscured effect. As another example, the same mask can be applied to the resulting image in a different way (for instance, the inverse of the mask can be added to the resulting image). FIG. 4F illustrates an image with a further obscured blurred region. In some embodiments, the image with an obscured blurred region is displayed to the user while he configures the mask. Once the user finishes configuring the mask, he can release his finger, click on a button, and/or use any other appropriate action to indicate that the configuration of the mask is finalized. Subsequently, the user can indicate that the image is to be finalized, for example by capturing a live image using the camera, saving the final image (e.g., the image of FIG. 4E), applying additional filtering effects, sharing the final image by email, posting to websites, etc.

Figure 5A:
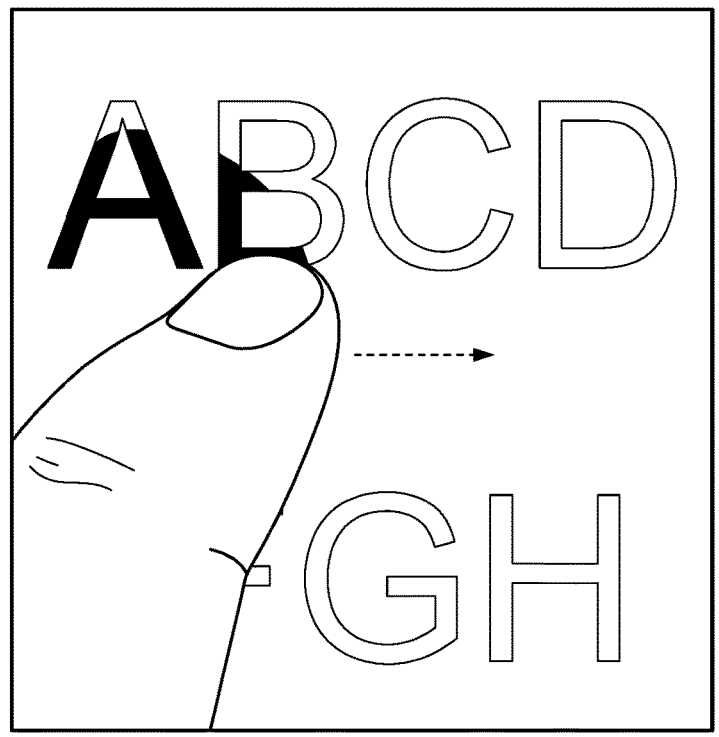
FIGS. 5A-5F are example diagrams illustrating embodiments of a mask configuration process.
Figure 5B:
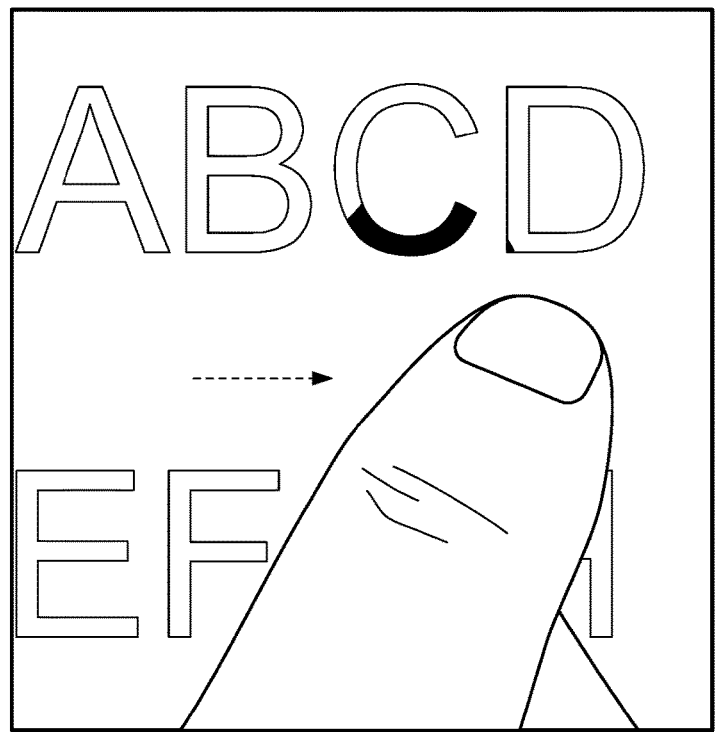

In some embodiments, process 300 is implemented on a device with a multi-touch touchscreen supporting gesture interpretation. The user is given the option to use touchscreen gestures to configure the mask. FIGS. 5A-5F are example diagrams illustrating embodiments of a mask configuration process. Once a mask is selected, the user interacts with the device and the image processing software using gestures, adjusting the position and shape of the mask using touchscreen gestures, including dragging a finger to reposition the mask, pinching or spreading multiple fingers to resize the mask, etc. In FIG. 5A, for example, the user sets the initial position of a disk-shaped mask by pressing on the touchscreen using a finger or stylus. The touchscreen detects and records the location of the touch. The mask is applied to the original image and the blurred image version, and a resulting composite image based on the current location of the mask with an obscured blurred region is displayed. The user can reposition the mask by dragging the finger around on the touchscreen. The direction of the finger's motion is shown in the dashed arrow. FIG. 5B shows a repositioned mask. The mask engine follows the user's finger motion and repositions the mask based on the current location of the user's finger. The effects engine computes a new result image with an obscured blurred region. The new results image is displayed to the user. In some embodiments, so long as the user's finger stays on screen, the mask and the result image are continuously updated based on the current location of the finger. Since the blurred image version is precomputed, applying a mask to the original image and the blurred image version to generate a composite image is a relatively inexpensive operation.

Figure 5C:
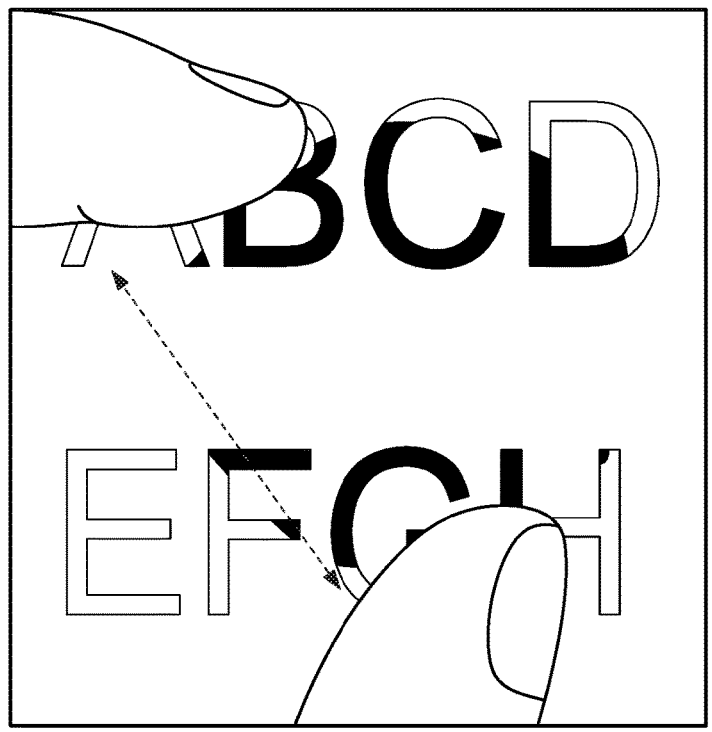

The user can also resize the mask by using touch screen gestures, such as pinching or spreading two fingers on the touchscreen. The example of FIG. 5C shows that the user spreads or pinches two fingers on the touchscreen. The mask engine detects the user gesture to enlarge or shrink the mask. In the example shown, the mask engine resets the diameter of the mask based on the current locations of the two fingers, making the size of the mask larger when the fingers are spread apart (e.g., as depicted by the dashed arrow), and smaller when the fingers are pinched together (not shown).

Figure 5D:
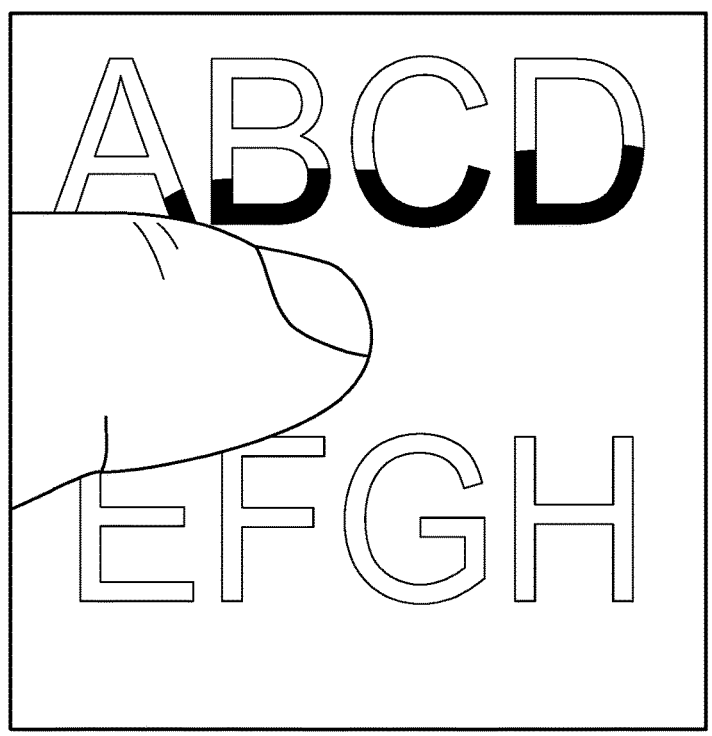
Figure 5E:
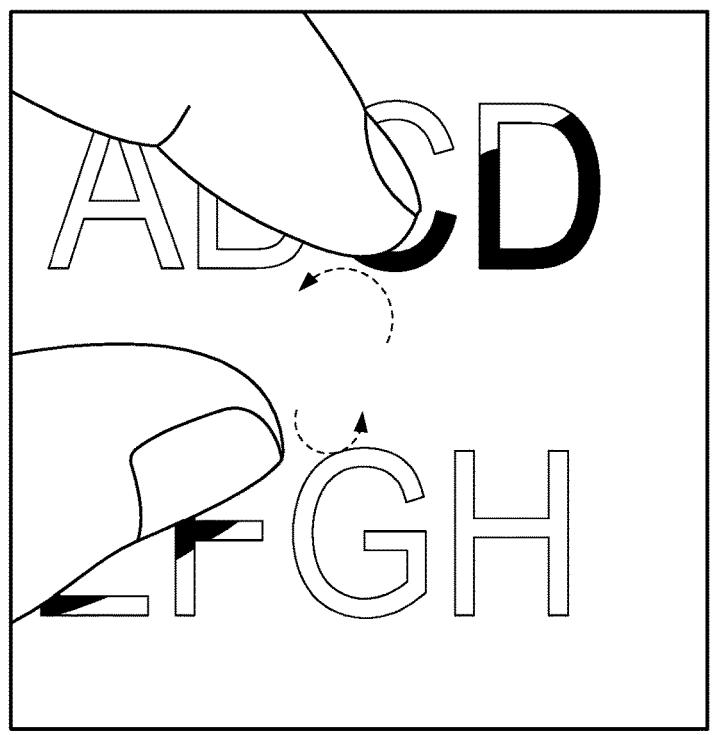
Figure 5F:
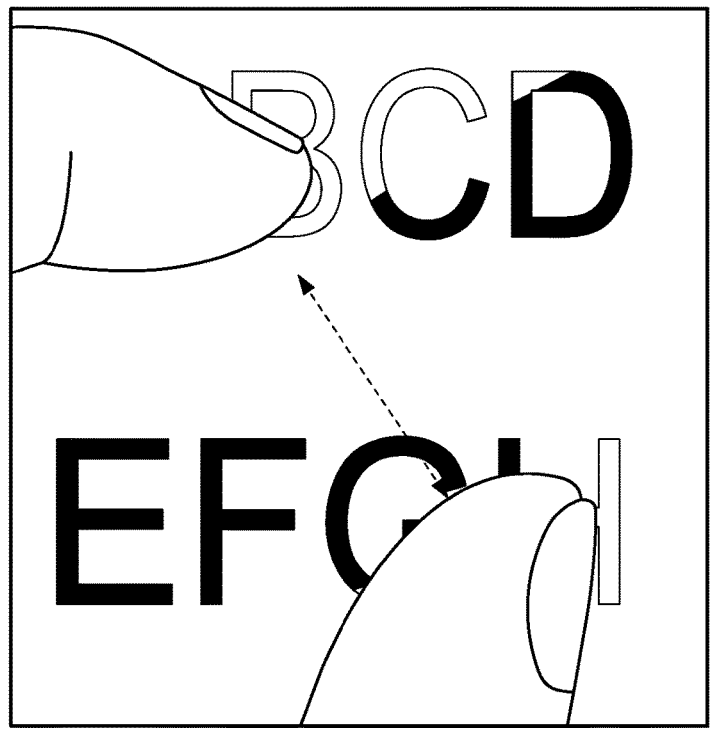

FIG. 5D illustrates an example bar-shaped mask that is selected by the user. The bar-shaped mask by default initially appears to be a horizontal bar across the image. FIG. 5E illustrates an example gesture used to tilt the mask. Specifically, the user puts two fingers on the touchscreen. The touchscreen interface detects the positions of the two fingers, and reorients the bar-shaped mask based on the finger positions and the current orientation of the mask, making the mask appear to follow the movements of the fingers. In the example shown, the user moves her upper finger in the direction of the top arrow and the lower finger in the direction of the lower arrow; thus, the mask appears to tilt approximately 45° from its original horizontal position. FIG. 5F illustrates an example gesture used to resize the bar-shaped mask. Specifically, the user spreads or pinches two fingers on the screen. The mask engine detects the user gesture to enlarge or shrink the mask. In the example shown, the mask engine resets the width of the mask based on the current locations of the two fingers, making the bar-shaped mask wider when the fingers are spread apart (e.g., as depicted by the dashed arrow), and narrower when the fingers are pinched together (not shown).

Figure 6:
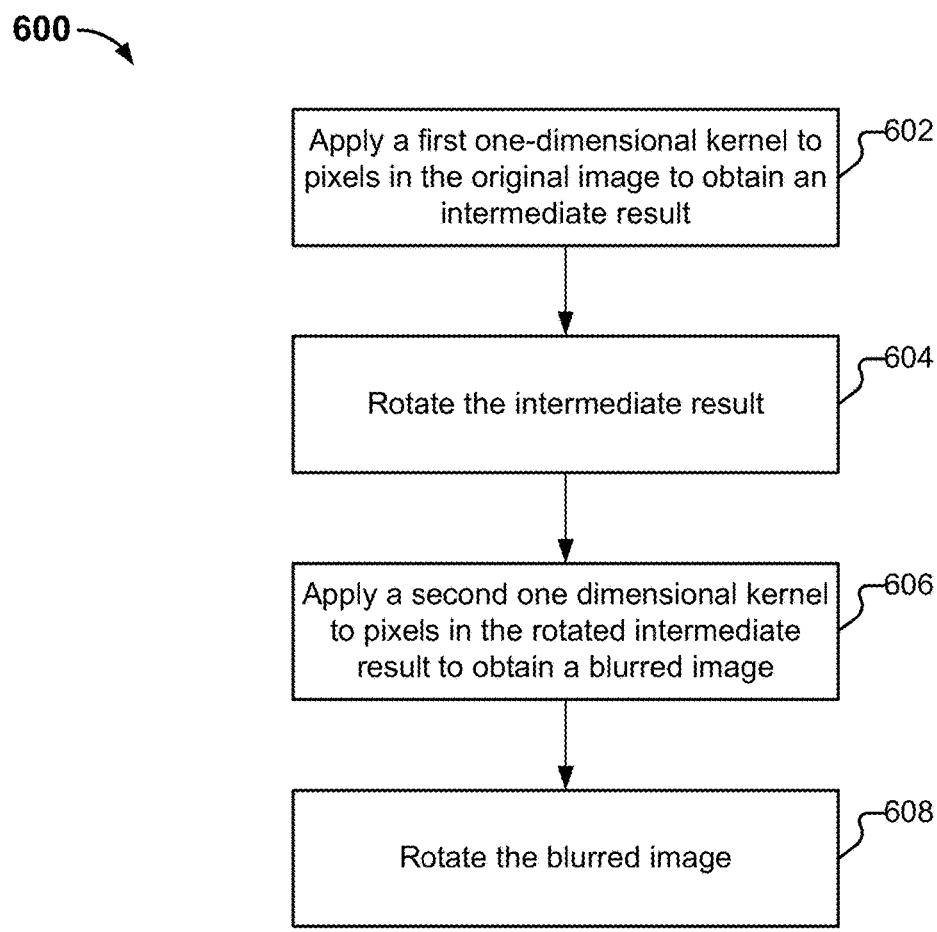
FIG. 6 is a flowchart illustrating an embodiment of a process for applying shader code.

FIG. 6 is a flowchart illustrating an embodiment of a process for applying shader code. Process 600 can be used to implement 304 of process 300.

At 602, a first one-dimensional kernel is applied to pixels in the original image to generate an intermediate result, which in this case is an image that is blurred in one direction (e.g., along the x-axis of the original image). As will be described in greater detail below, the first one-dimensional kernel is precomputed based on a blur function (e.g., a Gaussian blur function or box blur function) to achieve the desired blurring effects. Furthermore, the application of the one-dimensional kernel includes subsampling the neighboring pixels of each pixel to be blurred, which further improves efficiency.

At 604, the intermediate result is rotated. In the example illustrated here, the intermediate result image is rotated 90°.

At 606, a second one-dimensional kernel is applied to the rotated intermediate result to obtain a blurred image. Depending on implementation, the second one-dimensional kernel can be the same as the first one-dimensional kernel, or different from the first one-dimensional kernel (e.g., based on a blur function with different coefficients, a different type of blur function, etc.). In the case where the second one-dimensional kernel is the same as the first one-dimensional kernel, the intermediate result is used as the input to the same processing code of 604. The application of the second one-dimensional kernel blurs the image in a second direction (e.g., along the y-axis of the original image).

At 608, the blurred image is rotated again (by 90° in this example). In some embodiments, the rotation is performed because the same code is executed twice (once to blur the image along the x-axis and once to blur the image along the y-axis). Depending on the specific requirements of the system, the blurred image can be stored directly, or be rotated 180° and stored.

While the resulting image in each step can be stored in a separate buffer, in some embodiments, the technique reuses certain image buffers to save memory. For example, in some embodiments, the original image is stored in a first buffer; the intermediate image resulting from step 602 is stored in a second buffer; the rotated intermediate image resulting from step 604 is stored in a third buffer; the blurred image resulting from step 606 is stored into the second buffer; finally, the rotated blurred image resulting from step 608 is stored into the third buffer.

Figure 7:
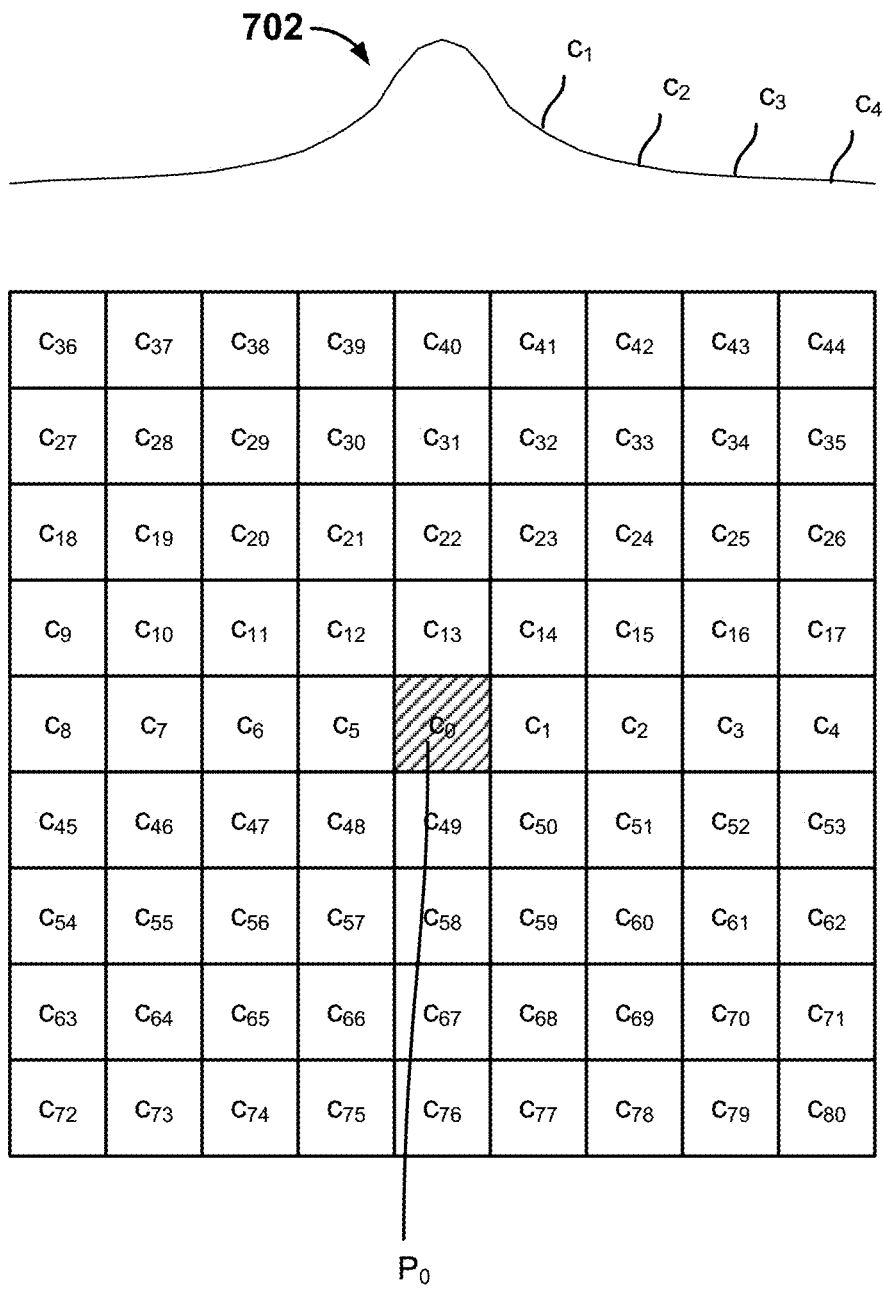
FIG. 7 is a diagram illustrating an example two-dimensional kernel.

Before the operations of the one-dimensional kernel are explained, the operations of a two-dimensional kernel are first discussed. FIG. 7 is a diagram illustrating an example two-dimensional kernel. In this diagram, a pixel $P_0$ (shaded pixel in the center of the grid) undergoes a blur operation using a two-dimensional kernel, which takes into account $P_0$ and its neighboring pixels. In this example, the two-dimensional kernel assigns multiplication coefficients ($c_0$, $c_1$, $c_2$, etc.) to the respective neighboring pixels ($P_0$, $P_1$, $P_2$, etc.), where the values of the coefficients are computed based on a blur function and the relative positions of the neighboring pixels. For example, the values of coefficients $c_1$, $c_2$, $c_3$, and $c_4$ are illustrated on blur function curve 702. The blurred result $P_0'$ is expressed as the normalized sum of coefficients multiplied with the respective neighboring pixels as follows:

$$P_0' = \Sigma_{i=0}^{80} c_i P_i$$

Accordingly, in this example, 80 neighboring pixels are obtained to carry out the blur operation for each pixel in the original image, which is inefficient and can cause performance degradation.

Figure 8:
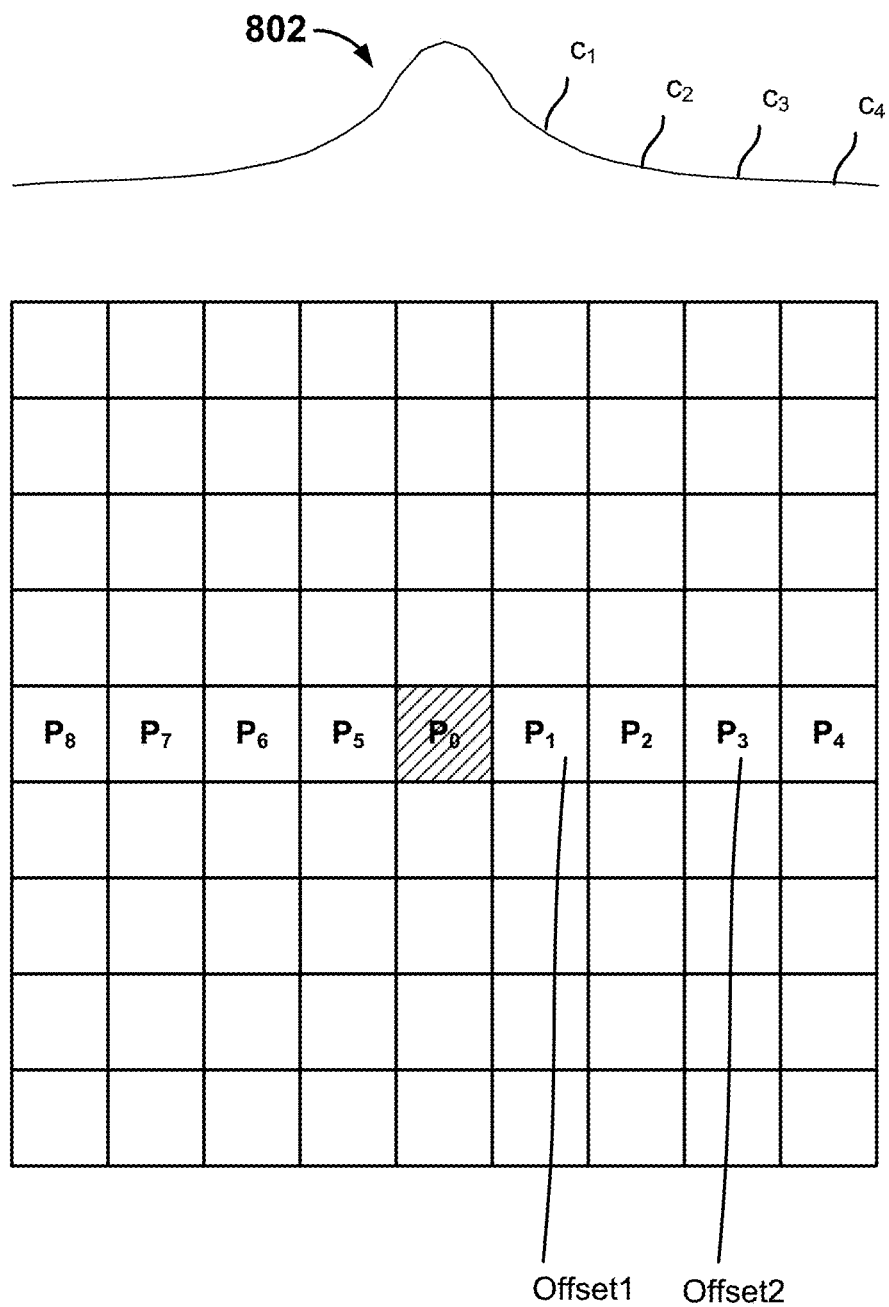
FIG. 8 is a diagram illustrating an example one-dimensional kernel.

FIG. 8 is a diagram illustrating an example one-dimensional kernel. The one-dimensional kernel approximates a blur function in one dimension for each pixel in the image, and greatly reduces the number of neighboring pixels that need to be taken into account for computing a blurred result for a given pixel $P_0$. In this example, the one-dimensional kernel approximates a Gaussian blur function, and takes into account eight neighboring pixels along the x-axis ($P_1$-$P_8$) with four pixels on each side of $P_0$.

The Gaussian blur function is represented as follows:

$$G(x) = \frac{1}{\sigma\sqrt{2\pi}} e^{-\frac{x^2}{2\sigma^2}} \quad (1)$$

where $\sigma$ corresponds to the standard deviation and determines the shape of the Gaussian distribution curve.

Rather than computing a sum of coefficients multiplied with the respective neighboring pixels in the form of $P_0' = \Sigma_{i=0}^{8} c_i P_i$, the neighboring pixels are subsampled to further reduce the amount of computation required. Specifically, in some embodiments, a graphics library such as OpenGL is used to implement the shader code that applies the one-dimensional kernel. The library provides function calls for subsampling pixels that are optimized to take advantage of the way pixel arrays are stored in memory. For example, the glReadPixels function receives as inputs the location of a first pixel and an offset from a reference location, and returns a new, interpolated pixel. In some embodiments, the interpolated pixel value corresponds to a weighted sum of the first pixel and its neighbor, where the weight of each contributing pixel is determined based on the offset, as follows:

$$glReadPixels(P_x, offset) = P_{new} = w_1 P_x + w_2 P_{x+1} \quad (2)$$

where $w_1 = 1 - 0.5 offset$; $w_2 = 0.5 offset$

In some embodiments, once an offset is chosen, a scaling factor is applied to the results to obtain the desired coefficient values. In one example, according to blur function 802, the values of $c_1$ and $c_2$ are 0.8 and 0.6, respectively. An offset (Offset1) of 0.857 and a scaling factor of 1.4 result in the following:

$$1.4 \cdot glReadPixels(P_1, 0.857) = 1.4 \cdot (0.571 P_1 + 0.429 P_2)$$
$$= 0.8 P_1 + 0.6 P_2 \quad (3)$$

glReadPixels subsamples $P_1$ and $P_2$ at Offset1, and the subsampled result is multiplied with the scaling factor. The subsampled and scaled result is approximately the same as the sum of $P_1$ and $P_2$ multiplied with their respective blur function coefficients $c_1$ and $c_2$. The offset (Offset2) for where to subsample $P_3$ and $P_4$, and the scaling factor for coefficients $c_3$ and $c_4$ can be obtained similarly. Thus, by selecting an appropriate offset and multiplying glReadPixels with an appropriate scaling factor, a single call to glReadPixels can produce a sum of two blur coefficients multiplied with two neighboring pixels, which improves computation efficiency. Although the kernel shown in this example includes 8 pixels (4 neighboring pixels on each side of $P_0$), it only requires four calls to obtain the pixel values for computation. In this example, after the one-dimensional kernel is applied to each pixel in the original image, the intermediate result image is rotated, and the one-dimensional kernel is applied again to pixels in the rotated image.

In some embodiments, a single blur function is used, and the corresponding offsets and scaling factors are precomputed and stored in a table or other appropriate data structure, to be used by the shader code to generate the blurred image version. Table 1 shows an example one-dimensional kernel that accounts for four neighboring pixels on one side of the pixel of interest, and takes two samples. The offset and scaling factor associated with the sample taken between $P_1$ and $P_2$, as well as $P_3$ and $P_4$ are precomputed and stored to the table. The values can change depending on the selection of $\sigma$.

TABLE 1

|  | $P_1$, $P_2$ | $P_3$, $P_4$ |
| --- | --- | --- |
| Offset | 0.00218373609375 | 0.0051171475 |
| Scaling Factor | 0.3034684 | 0.0832605; |

Since different blur functions (e.g., Gaussian blur functions with different $\sigma$ values) have different coefficients that map to the one-dimensional kernel, in some embodiments, multiple sets of offsets and scaling factors are precomputed and stored so the user can select different blurring effects. In some embodiments, to achieve approximately the same amount of blurring visually for different original images having different resolutions, different kernel sizes are used. For example, for images that are 320 pixels by 320 pixels (320×320), a one-dimensional kernel similar to the one illustrated in FIG. 8 is used, where the kernel spans 4 pixels on each side of $P_0$, and requires 4 neighboring pixel samples to be taken (2 to the left of $P_0$ and 2 to the right of $P_0$). In some embodiments, the 320×320 image size corresponds to when the camera is in live capture mode. For images that are 640×640 (e.g., an image that is captured when the user hits the virtual shutter), a larger kernel that spans 8 pixels on each side of $P_0$ and requires 8 neighboring pixel samples is used. Other image sizes are possible since the user may capture images and store them with different resolutions, and/or import images from other sources. Table 2 illustrates the image sizes and corresponding kernel sizes that are used in some embodiments. The offsets and scaling factors corresponding to each kernel are precomputed and stored. When an image is received, the blur engine checks the size of the image and selects an appropriate one-dimensional kernel for the shader code to use.

TABLE 2

| Image Size | One-dimensional kernel size (total number of neighboring pixels) |
| --- | --- |
| 320 × 320 | 4 |
| 640 × 640 | 8 |

TABLE 2-continued

| Image Size | One-dimensional kernel size (total number of neighboring pixels) |
|---|---|
| 1280 × 1280 | 16 |
| 1920 × 1920 | 24 |
| 2560 × 2560 | 32 |

Image processing to generate a selectively blurred image has been described. The technique is computationally efficient, thus enabling the user to configure a mask interactively and receive instant feedback of the result from application of the mask.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
applying shader code to an original image to generate a blurred image version (BIV);
obtaining a composite image that is generated based at least in part on the original image and the BIV, wherein the composite image is generated by:
obtaining a mask that includes an unblurred region and a blurred region; and
applying the mask to combine the original image and the BIV to render a composite image that includes an unblurred portion comprising a portion of the original image corresponding to the unblurred region of the mask, and a blurred portion comprising a portion of the BIV corresponding to the blurred region of the mask; and
outputting the composite image to be displayed.

2. The method of claim 1, wherein location of the unblurred region of the mask corresponds to a position in the original image.

3. The method of claim 1, further comprising receiving configuration information associated with the mask.

4. The method of claim 1, wherein the shader code is precomputed.

5. The method of claim 1, wherein the shader code is precomputed for a plurality of kernels corresponding to a plurality of images sizes.

6. The method of claim 1, wherein the shader code includes a precomputed one-dimensional kernel based on a blur function.

7. The method of claim 1, wherein the shader code is selected among a plurality of precomputed shader codes that correspond to images of different sizes.

8. The method of claim 1, wherein applying the shader code includes:
applying a first one-dimensional kernel to the original image to generate an intermediate result;
rotating the intermediate result; and
applying a second one-dimensional kernel to the rotated intermediate result.

9. The method of claim 8, wherein applying the shader code further includes rotating a result of applying the second one-dimensional kernel to obtain the BIV.

10. A system, comprising:
one or more processors configured to:
apply shader code to an original image to generate a blurred image version (BIV);
obtain a composite image that is generated based at least in part on the original image and the BIV, wherein the composite image is generated by:
obtaining a mask that includes an unblurred region and a blurred region; and
applying the mask to combine the original image and the BIV to render a composite image that includes an unblurred portion comprising a portion of the original image corresponding to the unblurred region of the mask, and a blurred portion comprising a portion of the BIV corresponding to the blurred region of the mask; and
output the composite image to be displayed; and
one or more memories coupled to the one or more processors, configured to provide the one or more processors with instructions.

11. The system of claim 10, wherein:
location of the unblurred region of the mask corresponds to a position in the original image.

12. The system of claim 10, wherein the one or more processors are further configured to receive configuration information associated with the mask.

13. The system of claim 10, wherein the shader code is precomputed.

14. The system of claim 10, wherein the shader code is precomputed for a plurality of kernels corresponding to a plurality of images sizes.

15. The system of claim 10, wherein the shader code includes a precomputed one-dimensional kernel based on a blur function.

16. The system of claim 10, wherein the shader code is selected among a plurality of precomputed shader codes that correspond to images of different sizes.

17. The system of claim 10, wherein to apply the shader code includes to:
apply a first one-dimensional kernel to the original image to generate an intermediate result;
rotate the intermediate result; and
apply a second one-dimensional kernel to the rotated intermediate result.

18. The system of claim 17, wherein to apply the shader code further includes to rotate a result of applying the second one-dimensional kernel to obtain the BIV.

19. A computer program product embodied in a tangible non-transitory computer readable storage medium and comprising computer instructions for:
applying shader code to an original image to generate a blurred image version (BIV);
obtaining a composite image that is generated based at least in part on the original image and the BIV, wherein the composite image is generated by:
obtaining a mask that includes an unblurred region and a blurred region; and
applying the mask to combine the original image and the BIV to render a composite image that includes an unblurred portion comprising a portion of the original image corresponding to the unblurred region of the mask, and a blurred portion comprising a portion of the BIV corresponding to the blurred region of the mask; and
outputting the composite image to be displayed.

* * * * *